MAGNETIC RECORDING SYSTEM HAVING AN OPERATIONAL ENVIRONMENT OF LOW RELATIVE HUMIDITY

Filed March 25, 1965

JOHN F. CARROLL, JR.
ROBERT C. GOTHAM
INVENTORS

BY R. Frank Smith
Robert F. Crocker
ATTORNEYS

United States Patent Office 3,380,043
Patented Apr. 23, 1968

3,380,043

MAGNETIC RECORDING SYSTEM HAVING AN OPERATIONAL ENVIRONMENT OF LOW RELATIVE HUMIDITY

John F. Carroll, Jr., and Robert C. Gotham, Rochester, N.Y., assignors to Eastman Kodak Company, Rochester, N.Y., a corporation of New Jersey Filed Mar. 25, 1965, Ser. No. 442,685
9 Claims. (Cl. 340—174.1)

ABSTRACT OF THE DISCLOSURE

A magnetic recording and reproducing system comprising a transducing head and means for moving a magnetic record member in operative relationship past the transducing head wherein means is provided to maintain the relative humidity at the transducing head at about 20% to minimize wear of the transducer head.

Figure 1:
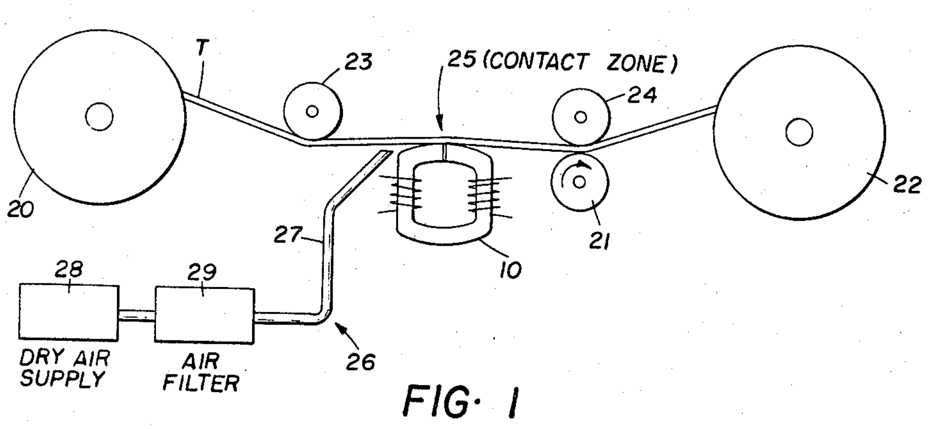

The present invention relates to magnetic recording and reproducing devices and particularly to improvement in a method and apparatus for reducing the wear of the magnetic transducer heads of such devices.

In such magnetic recording and reproducing devices, a magnetic record member is normally arranged to move past a magnetic transducing head so that any change in the magnetic characteristics of either will produce a corresponding change in the other. In order to obtain the maximum transducing sensitivity, it is desirable that the record member be maintained in intimate contact with the head. However, most record members are highly abrasive and, as a result, the active portions of the magnetic heads are subjected to considerable wear. For reasons well understood in the art, this results in a serious loss of sensitivity, particularly at the higher frequencies and, as a result, frequent replacement of the heads is required.

Furthermore, the usable life of the record member is shortened by the formation of agglomerates which form on the record member as the result of excessive abrasion. One source of such agglomerates is formed, for example, by the oxide in magnetic tape which will accumulate on the transducer head thereafter becoming pressed back into the pack when dislodged due to tape movement to adversely affect the response of the tape.

Various solutions to this excessive abrasion of the transducer head have been proposed.

For example, it has been proposed to mechanically maintain a minute predetermined spacing between the magnetic transducer head and a recording member, for example, a tape or a magnetizable drum. Present manufacturing practices make it possible to initially provide for guidance of spacing in the range of .0003 of an inch; however, this spacing is extremely difficult to maintain because of changes in tape thickness, tensioning and varying speeds of tape travel as well as the inevitable wear of the mechanical parts. As has previously been stated, maximum sensitivity is obtained when full contact is present between the recording member and the transducer head. It can be seen that any spacing, even in the range of .0003 of an inch, which is extremely difficult to maintain, will adversely affect the sensitivity of response between the record member and the transducer head.

It has further been proposed to provide a predetermined spacing between the transducer head and the magnetic tape by inducing or forcing air at sufficient velocity and pressure to effectively float the head on a layer of air. The same difficulties have been encountered as stated above; namely, adverse sensitivity of response, difficulty in maintaining the desired air space and outages due to the unexpected failure of air conveying equipment.

Still another arrangement proposed has been to lay upon the recording surface a film of lubricant in advance of the point of contact with the recording head. Such lubricants have not proved effective in solving the abrasion problem and further introduce an unnecessary contaminant into an otherwise highly sensitive area which should be maintained unusually clean. Furthermore, such a lubricant, as in the case of the air spacing, detracts from the sensitivity of the recording medium.

It is therefore one object of this invention to overcome the above deficiencies by providing an improved magnetic recording and reproducing system which appreciably reduces the wear associated with the magnetic transducer head without adversely affecting the magnetic characteristics of the head.

It is another object of this invention to provide such a system which will achieve the reduced abrasion of the transducer head while still maintaining intimate contact between the recording member and the transducer head so as to obtain maximum transducing sensitivity.

It is the further object of this invention to provide a system for reducing wear of a magnetic transducer head which is readily applicable to most conventional magnetic recording and reproducing systems, requiring only minor and relatively inexpensive modification thereof.

The present invention meets the problem by providing a magnetic recording and reproducing system wherein the recording member is maintained in intimate contact with the magnetic transducer head and a simple and inexpensive means is provided whereby a region of low humidity may be maintained in the immediate vicinity of the area of contact between the recording member and the transducer head. An important feature of the preferred practice of this invention is the concept of directing a stream of dry air or other gas against the tape just ahead of its coming into contact with the head.

The procedure in accordance with our invention may more readily be described by referring to the novel apparatus by which the reduction in wear of the transducer head is carried out.

In the accompanying drawings, FIG. 1 illustrates a simplified front elevation of a magnetic tape recording and reproducing system illustrating a selected embodiment of this invention.

Figure 2:
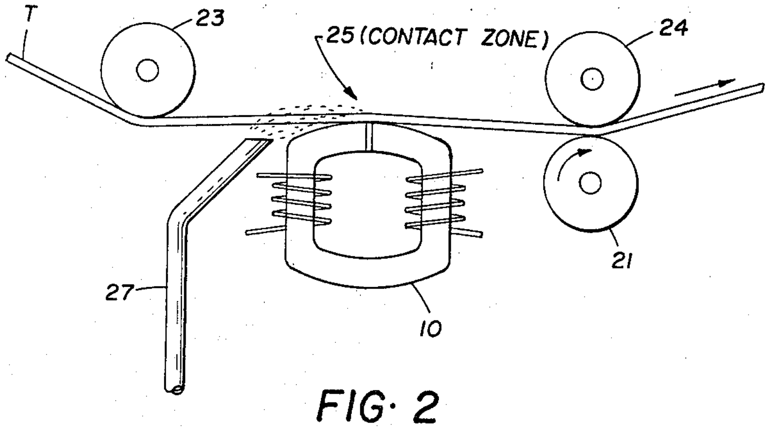

FIG. 2 is an enlarged fragmentary sectional view showing in more detail the application of dry air or other gas against the tape in the region of the contact zone.

FIG. 1 illustrates the application of our invention to a typical magnetic recording and reproducing system where magnetic tape passes in direct frictional contact with the transducing head. In such a system the magnetic recording tape, generally designated by the letter T, passes through a transducer assembly comprising a transducer head 10, on one side of the traveling tape and guides 23 and 24 on the other side. The tape T approaches the transducer assembly from a feed reel 20 and is drawn through the assembly by the usual drive capstan 21 and then is rewound on a takeup reel 22. The tape is given the desired tension to insure intimate surface contact with the transducer head over a predetermined area generally indicated at 25 by means of the guides 23 and 24. However, any other conventional means of tensioning the tape against the transducer head may be used.

In such a magnetic recording and reproducing system, the transducer head usually comprises a core having a pair of pole pieces of high magnetic permeability with their tips slightly separated to provide an extremely narrow non-magnetic gap therebetween. While certain other materials can be used, the core and its pole pieces are most commonly formed of various alloys of iron and nickel with small amounts of such material as molybdenum or chromium included therein. While these alloys, known in the art as Mumetal or HyMu 80, have excellent magnetic properties for this application, they are adversely subject to wear as a result of the abrasive action of the tape as it moves across the transducer head.

Historically, magnetic recording and reproducing facilities have been operated in areas of ideal temperature and humidity. The reason for conditioning the air so strictly is generally to comply with recommended operating practices. Equipment manufacturers continually stress the importance of operating their equipment in an area of 50% relative humidity to obtain the most efficient operation. Tape manufacturers also recommend similar conditions under which their magnetic tape should be used, cared for and stored in order to protect its valuable recorded data. The dimensional stability (resistance to physical change as a result of varying ambient conditions) is the keynote of a good magnetic tape. It is recommended, by tape manufacturers, that the extremes of humidity and temperature be avoided to maintain this dimensional integrity in the tape.

We have discovered that the abrasion of transducer heads, of the type previously described, is directly related to the relative humidity maintained in the vicinity of the nip or contact zone between the transducer head and the magnetic tape. It has further been found that the tendency to produce loose or attached agglomerates on the tape is also substantially affected by the relative humidity maintained in this area. In this connection we have discovered that the abrasion rate of such magnetic permeable materials, e.g. Mumetal or HyMu 80, is greatly decreased when an atmosphere of approximately 20% relative humidity or lower is maintained in the immediate area adjacent to the contacting or rubbing surface of the tape and the transducer head.

An idea of the surprising effect that a reduction in humidity has on the rate of wear of Mumetal or other alloys similarly used in such applications may be gained from the following:

In studying the problem, test apparatus was designed wherein conventional recording tape could be drawn under carefuly controlled conditions of pressure and velocity across a Mumetal test piece. The loss in weight of the Mumetal test piece per given length of tape travel was used to indicate the relative wear rate. Magnetic tape which had been fully preconditioned at 50% relative humidity was utilized. The simulated recording and reproducing apparatus was also maintained within an area in which the relative humidity was 50%. When this tape was drawn past the test piece under normal, approximately 50% relative humidity conditions, the rate of wear was found to be 0.52 mg. per thousand feet of tape travel. However when the humidity in the immediate vicinity of the test piece was reduced by allowing low velocity air of approximately 20% relative humidity to drift across the tape at a point just ahead of the contact area between the tape and the test piece, all other conditions remaining the same, the rate of wear of the test piece dropped to approximately 0.02 mg. per thousand feet of tape travel. A decrease in the relative humidity of the applied air below 20% resulted in a still further reduction in the rate of wear. As further proof of this phenominal result, the observation was made that during the time dry air of 20% relative humidity was applied at the nip or contact zone, the power required by the tape drive mechanism in order to maintain the desired constant speed of tape travel, was substantially decreased from that required under normal operating conditions in the absence of said dry air. The tape in its movement past the transducer head was maintained at a constant speed during all the above findings. Favorable results were also obtained regardless of whether the speed of the tape travel varied; for example, decreased wear resulted for tape travel which varied between 30 and 120 inches per second so long as a dry atmosphere was caused to exist at the contacting zone. A review of specialized knowledge and literature in the related field of friction and magnetic tape characteristics has not as yet revealed an explanation for these improved results.

Tests were also conducted which showed that the area in which the dry air or other dry gas is introduced is a critical factor in thus reducing abrasion of the head and that this area must be quite close to the head. No improvement in the abrasion rate of the head was evident, for example, when the magnetic tape was subjected to dry air of 20% relative humidity at a location spaced appreciably ahead of the contacting zone.

In our testing, several means were used to supply dry air. Both high and low pressure air producing systems were used, and demonstrated that humidity is the controlling factor, and not air pressure. In the first instance, a compressed air line was used as a source of dry air. Dry compressed air was directed across the advancing tape immediately adjacent the contacting zone, making sure that intimate contact was maintained between the test piece and the tape at all times. Another method of supplying dry air was provided by a small air pump used in conjunction with simple desiccants such as anhydrous chemicals. Dry ambient air of 20% relative humidity or lower was allowed to drift across the tape in the desired area. Both means of supplying dry air resulted in the marked improvement in the abrasion rate of the test piece in the manner previously described. Other dry gases such as nitrogen, etc., were also used with similar results.

Therefore, in accordance with our invention, we have provided means for maintaining low humidity at the contacting zone of the magnetic tape and transducer head; such means being readily includable in the magnetic recording and reproducing system described above. FIG. 1 illustrates the presently preferred embodiment of the invention wherein the system is modified to include the additional assembly designated as 26 to supply the necessary dry air. Dry air is supplied from a source 28, such as a dry air pump, is preferably filtered at 29 and enters the air supply conduit 27. The exit end of air supply conduit 27 is positioned so as not to impede normal operation of the recording and reproducing process while directing the dry air to the area immediately adjacent the contacting surface of the traveling tape and the transducing head. It is only necessary that the dry air be permitted to drift across the tape just ahead of the contacting zone so as to flood a relatively small area. This is specifically illustrated in FIG. 2 where it will be noted that only a very small area, designated as the contacting zone by 25, is flooded with an atmosphere of dry air of 20% relative humidity or lower.

Any suitable means can be used to supply the necessary dry air or other gases to the contacting region. The several methods of supplying the required dry air in our testing apparatus are equally suitable for use in any conventional magnetic recording and reproducing system. Other sources of dry gases can be provided, for example by using bottled nitrogen gas which can be used at reduced pressure to purge the contacting zone in the manner illustrated in FIG. 2.

Although we have chosen to describe the use of a filtering element 29, such a component may not be required when the source of the dry air or gas is free of dust, lint or other foreign matter. The presence of such contaminants in the dry air or gas source can adversely affect the readout of the tape and therefore, if the need arises, should be filtered out of the air stream.

The invention has been described in detail with particular reference to preferred embodiments thereof, but it will be understood that variations and modifications can be effected within the spirit and scope of the invention as described hereinabove and as defined in the appended claims.

What is claimed is:

1. A magnetic recording and reproducing system comprising a transducing head, means for moving a magnetic record member past said transducing head in operative relationship therewith, and means for maintaining a relative humidity substantially less than about 50% at least in the area in which the record member is in operative relationship with said transducing head.

2. The invention according to claim 1 wherein the relative humidity in the area in which the record member is in operative relationship with the transducing head is substantially less than the relative humidity of the remainder of the system.

3. The invention according to claim 1 wherein the relative humidity is not greater than about 20%.

4. The invention according to claim 1 wherein said humidity maintaining means comprises means to supply a substantially dry gas to the area in which the record member is in operative relationship with said transducer head.

5. In a magnetic transducing apparatus of the type having a transducing head, adapted to cooperate with a magnetic record member, wherein means is provided for causing relative movement between said record member and said head while maintaining intimate contact therebetween over a predetermined contact area, the improvement comprising means for supplying dry gas of relative humidity not greater than about 20% to flood the area immediately adjacent to the contacting area of said record member and head.

6. A magnetic recording and reproducing system comprising a transducing head formed of a magnetic permeable material of an alloy of iron and nickel and a small quantity of a material selected from the group consisting of molybdenum and chromium, means for moving a magnetic record member past said transducing head in operative relationship therewith, and means to supply a substantially dry gas to the area in which the record member is in operative relationship with said transducer head to maintain a relative humidity of not greater than about 20% in that area to minimize wear of the transducing head by the record member.

7. The method of operating magnetic recording and reproducing apparatus having a transducing head arranged to cooperate with a magnetic record member comprising the steps of moving said record member past said transducing head in operative relationship therewith, and during such movement, flooding the area immediately ahead of said transducing head with a gas having a relative humidity of substantially less than 50%.

8. The invention according to claim 7 wherein said flooding is performed by directing air having a relative humidity substantially less than 50% against each portion of said record member.

9. The invention according to claim 7 wherein the relative humidity of such gas is not greater than about 20%.

References Cited

UNITED STATES PATENTS

| | | | |
|---|---|---|---|
| 3,319,238 | 5/1967 | Jacoby | 179—100.2 |
| 3,075,051 | 1/1963 | Pankratz et al. | 179—100.2 |

BERNARD KONICK, *Primary Examiner.*

A. I. NEUSTADT, *Assistant Examiner.*